(12) United States Patent
Melzner et al.

(10) Patent No.: US 12,460,790 B2
(45) Date of Patent: Nov. 4, 2025

(54) ILLUMINATION APPARATUS

(71) Applicant: Arnold & Richter Cine Technik Gmbh & Co. Betriebs KG, Munich (DE)

(72) Inventors: Erwin Melzner, Frasdorf (DE); Volker Schumacher, Bad Waldsee (DE); Frank Hendricks, Bad Waldsee (DE)

(73) Assignee: ARNOLD & RICHTER CINE TECHNIK GMBH & CO. BETRIEBS KG, Munich (DE)

( * ) Notice: Subject to any disclaimer, the term of this patent is extended or adjusted under 35 U.S.C. 154(b) by 0 days.

(21) Appl. No.: 18/749,981

(22) Filed: Jun. 21, 2024

(65) Prior Publication Data
US 2024/0426460 A1 Dec. 26, 2024

(30) Foreign Application Priority Data
Jun. 22, 2023 (DE) .......................... 102023116459.7

(51) Int. Cl.
| | |
|---|---|
| *F21V 5/00* | (2018.01) |
| *F21V 17/00* | (2006.01) |
| *F21Y 105/16* | (2016.01) |
| *F21Y 113/13* | (2016.01) |
| *F21Y 115/10* | (2016.01) |

(52) U.S. Cl.
CPC ............ *F21V 5/007* (2013.01); *F21V 17/002* (2013.01); *F21Y 2105/16* (2016.08); *F21Y 2113/13* (2016.08); *F21Y 2115/10* (2016.08)

(58) Field of Classification Search
CPC .... F21V 5/007; F21V 17/002; F21Y 2105/16; F21Y 2113/13; F21Y 2115/10
See application file for complete search history.

(56) References Cited

U.S. PATENT DOCUMENTS

| | | | |
|---|---|---|---|
| 8,042,972 B2 | 10/2011 | Joergensen et al. | |
| 8,931,939 B2 | 1/2015 | Melzner et al. | |
| 9,046,232 B2 | 6/2015 | Melzner et al. | |
| 10,337,707 B2* | 7/2019 | Jurik ........................ | F21V 14/02 |
| 2006/0039160 A1* | 2/2006 | Cassarly ............ | G02B 27/0961 |
| | | | 362/551 |

(Continued)

FOREIGN PATENT DOCUMENTS

| | | |
|---|---|---|
| DE | 212006000023 U1 | 1/2008 |
| DE | 602005003828 T2 | 11/2008 |

(Continued)

OTHER PUBLICATIONS

WO 2010150149 English Translation (Year: 2010).*

*Primary Examiner* — Zheng Song
(74) *Attorney, Agent, or Firm* — Lando & Anastasi, LLP

(57) ABSTRACT

Aspects and embodiments disclosed herein include an illumination apparatus comprising an LED light generating device comprising groups of LEDs spatially distributed on an emission surface for the generation of light, the generated light being emitted from the emission surface of the LED light generating device through a transparent and resistant protective screen of the LED light generating device, and comprising a replaceable light shaping device mounted in front of the transparent protective screen of the LED light generating device for shaping the light emitted from the emission surface of the LED light generating device.

28 Claims, 5 Drawing Sheets

(56) References Cited

U.S. PATENT DOCUMENTS

| | | | | |
|---|---|---|---|---|
| 2008/0068839 A1* | 3/2008 | Matheson | ............... | F21V 21/30 |
| | | | | 362/249.07 |
| 2008/0310152 A1 | 12/2008 | Verbrugh et al. | | |
| 2010/0039812 A1* | 2/2010 | Cheng | ................ | G02B 19/0066 |
| | | | | 362/241 |
| 2010/0135007 A1* | 6/2010 | Seabrook | ................ | F21V 29/89 |
| | | | | 362/218 |
| 2012/0068615 A1* | 3/2012 | Duong | .................... | A01G 9/249 |
| | | | | 313/503 |
| 2015/0192274 A1* | 7/2015 | Kubis | ....................... | F21K 9/60 |
| | | | | 362/237 |
| 2015/0211708 A1* | 7/2015 | Stavely | ............... | G02B 3/0056 |
| | | | | 362/231 |
| 2017/0219186 A1* | 8/2017 | Enno | .................... | F21V 7/0091 |
| 2017/0227209 A1* | 8/2017 | Slabek | .................... | F21V 15/01 |

FOREIGN PATENT DOCUMENTS

| | | | | |
|---|---|---|---|---|
| DE | 102007044566 A1 | 3/2009 | | |
| DE | 202019100380 U1 | 4/2020 | | |
| EP | 2233819 B1 | 6/2012 | | |
| WO | WO-2010150149 A2 * | 12/2010 | ......... | H05B 33/0803 |
| WO | 2011020920 A1 | 2/2011 | | |

\* cited by examiner

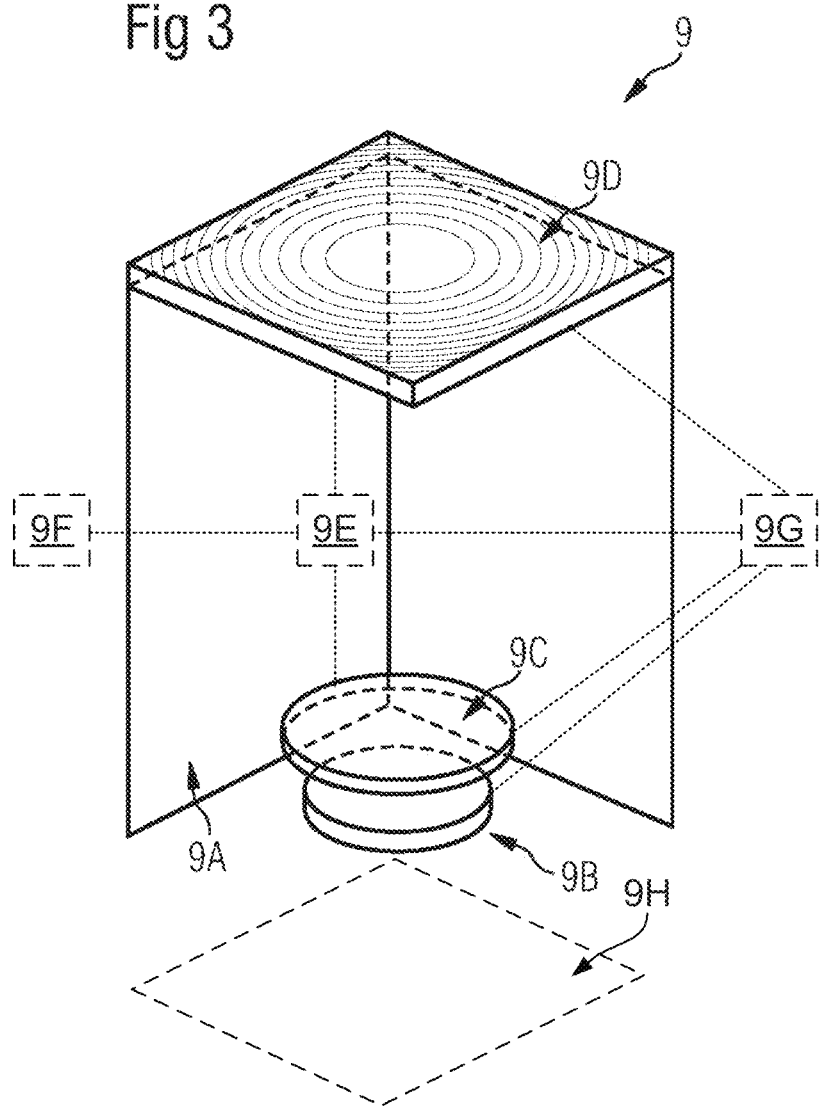

ILLUMINATION APPARATUS

CROSS-REFERENCE TO RELATED APPLICATIONS

This application claims priority under 35 U.S.C. § 119 to German Patent Application Serial No. 102023116459.7 titled "Beleuchtungsvorrichtung," filed Jun. 22, 2023, the entire content of which is incorporated herein by reference for all purposes.

FIELD OF TECHNOLOGY

Aspects and embodiments disclosed herein relate to an illumination apparatus for emitting light with different radiation characteristics.

BACKGROUND

The lighting systems used to date use different light sources and emission surfaces to emit light at a certain half-scatter angle.

In order to achieve a lighting effect, illumination apparatuses have light sources. A light source has a specific radiation characteristic. A light source is narrow beam or can emit narrowly or widely. A distinction can also be made between a compact light source with a relatively small emission surface and an extended light source with a relatively large emission surface.

The lighting effect that can be achieved by a light source results from its beam characteristics, i.e., the beam angle and the size of the light source that appears at the exit opening (aperture).

The light effect achieved by a light source is described as "soft" if an illuminated object is at a relatively small distance from the light source and the light source concerned is relatively large. In this respect, the light emitted by the light wave can, so to speak, flow around the illuminated object.

The lighting effect achieved by a light source is described as "hard" if an illuminated object is relatively remote from the light source and the light source concerned is relatively small. In extreme cases, this is a point light source.

There are known conventional light sources having a large aperture, but with a large number of light sources in them, in particular LED clusters, which in turn have a small half-scatter angle, i.e., emit narrow light. Such light sources are used as spotlights at medium to long distances. Such light sources generate a small spot of light, but the light, so to speak, also flows around an illuminated object at a shorter distance and therefore also creates multiple shadows.

The beam angle indicates the angle at which a luminous flux emerges from a spotlight. Depending on the distance between the light source and the illuminated surface, this creates a light cone with a corresponding diameter. The half-scatter angle is also known as the beam angle, half-value angle, or opening angle. It is the most frequently used beam angle in lighting technology and is therefore often specified by manufacturers. The half-scatter angle describes the metrologically relevant range of radiation and thus defines an abstract limit that cannot be perceived by the human eye. It is the angle between two points at which the light intensity drops to 50 percent of the maximum value. The diameter of a light cone is also specified using the half-scatter angle.

LED panel lights are known for providing soft light, wherein the emitted light has, for example, a relatively large half-scatter angle of 120 degrees. These conventional LED panel lights comprise a spatially distributed arrangement of light-emitting diodes that emit light through a diffuse cover lens to produce a soft, homogeneous light. To change the radiation characteristics of the light source, it is possible to provide, for example, prismatic plates or the like to achieve a lower half-scatter angle of 60 degrees. The relatively wide beam angle of conventional LED panel lights can be reduced using a combination of prismatic panels to achieve a hard light effect. For example, the original relatively wide half-scatter angle of about 120 degrees can be reduced to about 80 degrees, achieving about 1.5 times the luminous intensity of the original illumination apparatus. Nevertheless, this significantly reduces the energy efficiency (lumens per electrical energy supplied) of the illumination apparatus.

Furthermore, there are known conventional panel lights that have spatially distributed LED groups with optical lenses that focus the light generated by the LED groups. The light generated by the LED groups is mixed in the far field. The light emitted by the panel light is relatively narrowly focused and has a half-scatter angle of 20 degrees, for example. The emitted light can be used in the same way as a classic spotlight, i.e., a relatively high light intensity is provided at a greater distance. With such conventional panel lights, it is possible to change the beam characteristics of the light source using accessories. For example, the originally narrow half-scatter angle of 20 degrees, for example, can be extended to a wide half-scatter angle of around 120 degrees using a diffuser disk or a so-called softbox. Nevertheless, the energy efficiency of the illumination apparatus is also significantly reduced in this implementation. The efficiency is reduced by providing the light-absorbing diffuser panes after converting the originally narrowly focused light into light with a high scattering angle.

Furthermore, there are known illumination apparatuses that have a compact LED light source with densely packed light-emitting diodes with a small emission surface. Using the accessories, it is possible to increase a narrow half-scatter angle of 15 degrees, for example, so that a desired soft light effect can be achieved. Nevertheless, in this implementation there also comes a significant reduction in energy efficiency.

Further, the illumination apparatus is used to illuminate a film set-up in a wide variety of environments. In this respect, the illumination apparatus is exposed to different environmental influences. These environmental influences range from moisture or water to dust. Furthermore, the illumination apparatus may be exposed to fluctuating temperatures. In particular, environmental influences can impair the functionality of the illumination apparatus when used outdoors.

SUMMARY

Aspects and embodiments disclosed herein provide an illumination apparatus which allows light with different radiation characteristics to be emitted without reducing efficiency and which is robust against environmental influences.

In accordance with one aspect, there is provided an illumination apparatus comprising an LED light generating device comprising groups of LEDs spatially distributed on an emission surface for the generation of light, the generated light being emitted from the emission surface of the LED light generating device through a transparent and resistant protective screen of the LED light generating device, and comprising a replaceable light shaping device mounted in front of the transparent protective screen of the LED light generating device for shaping the light emitted from the emission surface of the LED light generating device.

In a possible embodiment of the illumination apparatus, the transparent and resistant protective screen for protection of the LED light generating device against environmental influences, in particular against moisture and/or dust, is provided directly in front of the emission surface of the LED light generating device.

In some embodiments of the illumination apparatus, the housing of the LED light generating device provided with the transparent protective screen provides a protection class IP65 or higher.

In a few embodiments of the illumination apparatus, the housing of the light shaping device also provides a protection class IP65 or higher.

In several embodiments of the illumination apparatus, the replaceable light shaping device comprises a replaceable soft optic device which shapes the light emitted from the emission surface of the LED light generating device for the generation of light with a large half-scatter angle of more than 90 degrees.

In various implementations, the replaceable soft optic device is capable of shaping the light emitted from the emission surface of the LED light generating device for the generation of light with a large half-scatter angle of more than 120 degrees.

In a number of embodiments of the illumination apparatus, the replaceable light shaping device comprises a replaceable spot optic device which shapes the light emitted from the emission surface of the LED light generating device for the generation of light with a small half-scatter angle of less than 45 degrees.

In a few implementations, the replaceable spot optic device is capable of shaping the light emitted from the emission surface of the LED light generating device for the generation of light with a small half-scatter angle of less than 30 degrees.

In some embodiments of the illumination apparatus, the replaceable light shaping device has a replaceable light dome which shapes the light emitted from the emission surface of the LED light generating device to generate a light radiating radially in different directions.

In various embodiments of the illumination apparatus, the replaceable light shaping device comprises a replaceable light trough which shapes the light emitted from the emission surface of the LED light generating device for the generation of light with a soft light effect.

In a number of embodiments of the illumination apparatus, the LED clusters arranged spatially distributed on the emission surface of the LED light generating device each have a plurality of differently colored LEDs or light-emitting diodes, which are closely spaced on the emission surface of the LED light generating device.

In several embodiments of the illumination apparatus, screening webs are provided between the LED groups arranged spatially distributed on the emission surface of the LED light generating device, said screening webs screening the light emitted laterally by the light-emitting diodes of the LED groups completely or partially.

In some embodiments of the illumination apparatus, the soft optic device comprises a hollow chamber with reflective side walls, to which a diffuser plate for the generation of light with a soft light effect is permanently or replaceably mounted.

In various embodiments of the illumination apparatus, the spot optic device comprises a two-dimensional field of juxtaposable or permanently mounted multi-lens optical systems, each of which is arranged above corresponding LED groups of the light generating device.

In a number of embodiments of the illumination apparatus according to the invention, the two-dimensional field of multi-lens optical systems has a first number, N, of rows and a second number, M, of columns.

In a few embodiments of the illumination apparatus, the various multi-lens optical systems within the two-dimensional field of the spot optic device can be addressed by means of a row number, i, and by means of a column number, j, by a control device of the illumination apparatus.

In several embodiments of the illumination device, each multi-lens optical system has a width, B, in an x-direction, a length, L, in a y-direction and a height, H, in a z-direction within the two-dimensional field of the spot optic device, wherein a surface oriented in the x-direction and in the y-direction is aligned parallel to the emission surface of the LED light generating device.

In some embodiments of the illumination apparatus, the multi-lens optical systems have an equal or different height, H, within the two-dimensional field of the spot optic device.

In a number of embodiments of the illumination apparatus, each multi-lens optical system of the spot optic device comprises a plurality of optical components, in particular optical lenses, arranged one above the other, which are delimited from neighboring multi-lens optical systems of the spot optic device by a corresponding stray light limitation of the respective multi-lens optical system.

In various embodiments of the illumination apparatus, the multi-lens optical system of the spot optic device comprises a first optical component which collimates the light emitted by the corresponding group of light-emitting diodes of the light generating device and directs it out of a downstream second optical component.

In some implementations, the first optical component of the multi-lens optical system may comprise a collimation lens that intercepts and focuses the light emitted by the corresponding group of light-emitting diodes of the light generating device.

In several embodiments of the illumination apparatus, the multi-lens optical system of the spot optic device comprises a second optical component arranged above the first optical component, which mixes the light emitted by the various light-emitting diodes of the group of LEDs and collected by the first optical component of the multi-lens optical system for color homogenization.

In various implementations, the second optical component of the multi-lens optical system can comprise a condenser lens, in particular a so-called honeycomb condenser or a fly-eye condenser, which is provided as an assembly for color homogenization.

In a number of implementations, the second optical component of the multi-lens optical system may comprise a diffuser disk, in particular a disk with a randomly distributed or defined structure.

In a few embodiments of the illumination apparatus, the multi-lens optical system of the spot optic device has a third optical component arranged above the second optical component, which emits the color-mixed light from the second optical component with a predetermined light intensity distribution and with a small half-scatter angle.

In several implementations, the third optical component of the multi-lens optical system may have a Fresnel lens.

In another possible implementation, the third optical component of the multi-lens optical system may comprise a converging lens, a diverging lens, a prism disk, or a diffuser disk.

In some embodiments of the illumination apparatus, a distance between the third optical component and the second optical component of an optical multi-lens system of the spot optic device can be automatically or manually adjusted to change the half-scatter angle of the respective optical multi-lens system.

In a number of embodiments of the illumination apparatus, the distance between the third optical component and the second optical component of a multi-lens optical system can be adjusted by means of a corresponding controllable actuator.

In a possible implementation of the illumination apparatus, the actuator is a servomotor. In an alternative possible implementation of the illumination apparatus, the actuator is a piezo drive. In another alternative possible implementation of the illumination apparatus, the actuator is a hydraulic drive.

In a few embodiments of the illumination apparatus, the controllable actuator of an optical multi-lens system can be addressed by a control device by means of a row number, i, and by means of a column number, j, of the optical multi-lens system within the two-dimensional field of the spot optic device and receives setting values for adjusting the distance between the third optical component and the second optical component of the optical multi-lens system from the control device.

In various embodiments of the illumination apparatus, a ratio between a half-scatter angle of the light emitted by the multi-lens optical system of the spot device and a half-scatter angle of the light emitted by the soft optic is approximately one to four.

In several embodiments of the illumination apparatus, the half-scatter angle of the light emitted by the multi-lens optical system of the spot optic device is adjustable in a range between 10 degrees and 30 degrees.

In a few embodiments of the illumination apparatus, the various groups of light-emitting diodes of the LED light generating device can be controlled independently of one another by a first control device for adjusting the brightness and/or color of the light generated by the respective group of LEDs.

In a possible implementation of the illumination apparatus, the first control device is integrated into the LED light generating device.

In some embodiments of the illumination apparatus, the actuators of the various multi-lens optical systems of the spot optic device can be controlled independently of one another by a second control device for adjusting the half-scatter angle of the light emitted by the respective multi-lens optical system of the spot optic device.

In a possible implementation of the illumination apparatus, the second control device is integrated into the spot optic device.

In a number of embodiments of the illumination apparatus, an emission direction of a light emitted by a multi-lens optical system of the spot optic device can be adjusted by a third control device.

In various embodiments of the illumination apparatus, the third control device is integrated into the spot optic device.

In a few embodiments of the illumination apparatus, the multi-lens optical system of the spot optic device comprises a protective screen for protection of the respective multi-lens optical system on an entry side facing the corresponding groups of light-emitting diodes and/or on an exit side.

In some embodiments of the illumination apparatus, a plurality of replaceable light shaping devices are mounted stacked on top of each other in front of the transparent and resistant protective screen of the LED light generating device for shaping the light emitted by the illumination device.

In a number of embodiments of the illumination apparatus, the two-dimensional field of multi-lens optical systems of the spot optic device has six (N=6) rows and twelve (M=12) columns.

In various embodiments of the illumination apparatus, the two-dimensional field of multi-lens optical systems of the spot optic device comprises groups of three by three multi-lens optical systems in each case.

BRIEF DESCRIPTION OF THE DRAWINGS

In the following, possible embodiments of the illumination apparatus are described in more detail with reference to the attached figures.

FIG. 3 illustrates a possible embodiment of a multi-lens system provided within a spot optic device;

DETAILED DESCRIPTION

Figure 1:
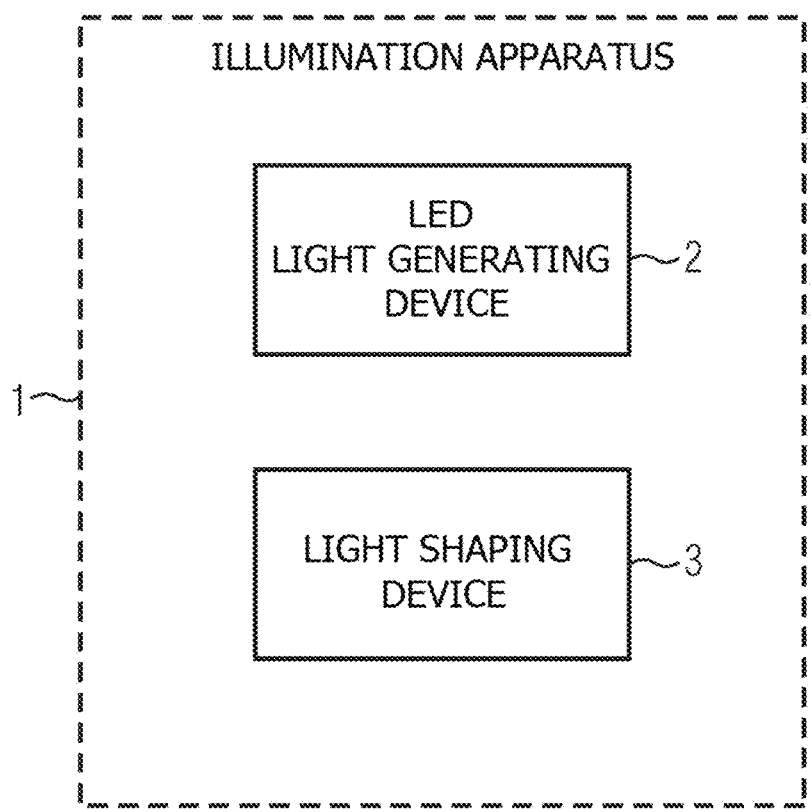
FIG. 1 illustrates a schematic block diagram of a possible embodiment of the illumination apparatus.

FIG. 1 schematically shows an embodiment of an illumination apparatus 1. The illumination apparatus 1 comprises an LED light generating device 2 and a replaceable light shaping device 3. The LED light generating device 2 comprises spatially distributed groups of LEDs or comparable lighting elements for the generation of light on an emission surface.

The generated light is emitted from the emission surface of the LED light generating device 2 through a transparent and resistant protective screen of the LED light generating device 2. The transparent and resistant protective screen for protection of the LED light generating device 2 against environmental influences is preferably provided directly in front of the emission surface of the LED light generating device 2. The transparent and resistant protective screen serves to protect the LED light generating device 2 from environmental influences, in particular from moisture and/or from dust and/or from temperature fluctuations.

A sealed housing of the LED light generating device 2 fitted with a transparent protective screen provides a protection class (ingress protection) IP65 or higher. The LED light generating device 2 is therefore both water and dust resistant. As protection against environmental influences and as an optical interface, the protective screen is preferably located directly in front of the LEDs of the LED light generating device 2. The LED light generating device 2 has mechanical connecting elements that make it possible to attach various light shaping devices 3 in front of the protective screen of the LED light generating device 2 in a replaceable manner. These mechanical connecting elements include, for example, guide pins and bushes as well as quick-release fasteners or similar.

In one possible embodiment, the replaceable light shaping device 3 shown in FIG. 1 comprises a replaceable soft optic device that shapes the light emitted from the emission surface of the LED light generating device 2 for the generation of light with a large half-scatter angle of more than 90 degrees. For example, the replaceable light shaping device 3 as a soft optic device can shape light with a large half-scatter angle of more than 120 degrees to achieve a soft light effect.

Furthermore, in one possible embodiment, the replaceable light shaping device 3 may comprise a replaceable spot optic device which shapes the light emitted from the emission surface of the LED light generating device 2 for the generation of light with a small half-scatter angle of less than 45 degrees. For example, the replaceable spot optic device can shape light with a small half-scatter angle of less than 30 degrees to achieve a hard light effect.

Furthermore, it is possible that the replaceable light shaping device 3 has a replaceable light dome or domes. The replaceable light dome reshapes the light emitted from the emission surface of the LED light generating device 2 for the generation of light emitted radially in different directions, so that a soft light effect can be achieved.

In another possible embodiment, the replaceable light shaping device 3 has a replaceable light trough that shapes the light emitted from the emission surface of the LED light generating device 2 for the generation of light with a soft light effect. The replaceable light trough is also known as a softbox.

The light groups arranged spatially distributed in front of the emission surface of the LED light generating device 2 preferably each comprise a plurality of differently colored LEDs positioned close to one another on the emission surface of the LED light generating device 2. Between the LED groups 4 arranged spatially distributed on the emission surface of the LED light generating device 2, screening webs or similar structures are preferably provided, which screen or block the laterally emitted light completely or partially. Furthermore, these structures can also be used to change the light emitted laterally by the LEDs of the LED groups 4.

In one possible embodiment, the replaceable light shaping device 3 has a soft optic device with a hollow chamber. The soft optic device comprises a hollow chamber with reflective side walls, to which a diffuser plate is permanently or replaceably mounted for the generation of light with a soft light effect. For example, a so-called white box can be provided, which has a hollow chamber with white reflective walls and to which a diffuser can be mounted. The construction depth of the hollow chamber and the diffuser and their reflection and transmission properties are preferably matched in such a way that the light from the LEDs is completely mixed and a homogeneously illuminated surface with a large beam angle is created. Different lighting effects can be achieved or adjusted by using different diffusers.

In one possible embodiment, the light shaping device 3 of the illumination apparatus 1 as shown in FIG. 1 comprises a spot optic device. This spot optic device preferably comprises a two-dimensional field of juxtaposed replaceable or permanently mounted multi-lens optical systems 9, each of which is arranged directly above corresponding LED groups 4 of the light generating device 2. The two-dimensional field of multi-lens optical systems 9 has a first number N of rows and a second number M of columns.

The various multi-lens optical systems 9 within the two-dimensional field of the spot optic device are preferably addressed by means of a row number i and a column number j by a control device of the illumination apparatus 1. Each multi-lens optical system 9 of the spot optic device has a width B in an x-direction, a length L in a y-direction and a height H in a z-direction within the two-dimensional field of the spot optic device. A surface oriented in the x and y directions is aligned parallel to the emission surface of the LED light generating device 2. The multi-lens optical systems 9 within the two-dimensional field of the spot optic device have the same or different heights H. Each multi-lens optical system 9 of the spot optic device preferably has several optical lenses arranged one above the other, as also shown in FIG. 3.

Figure 2:
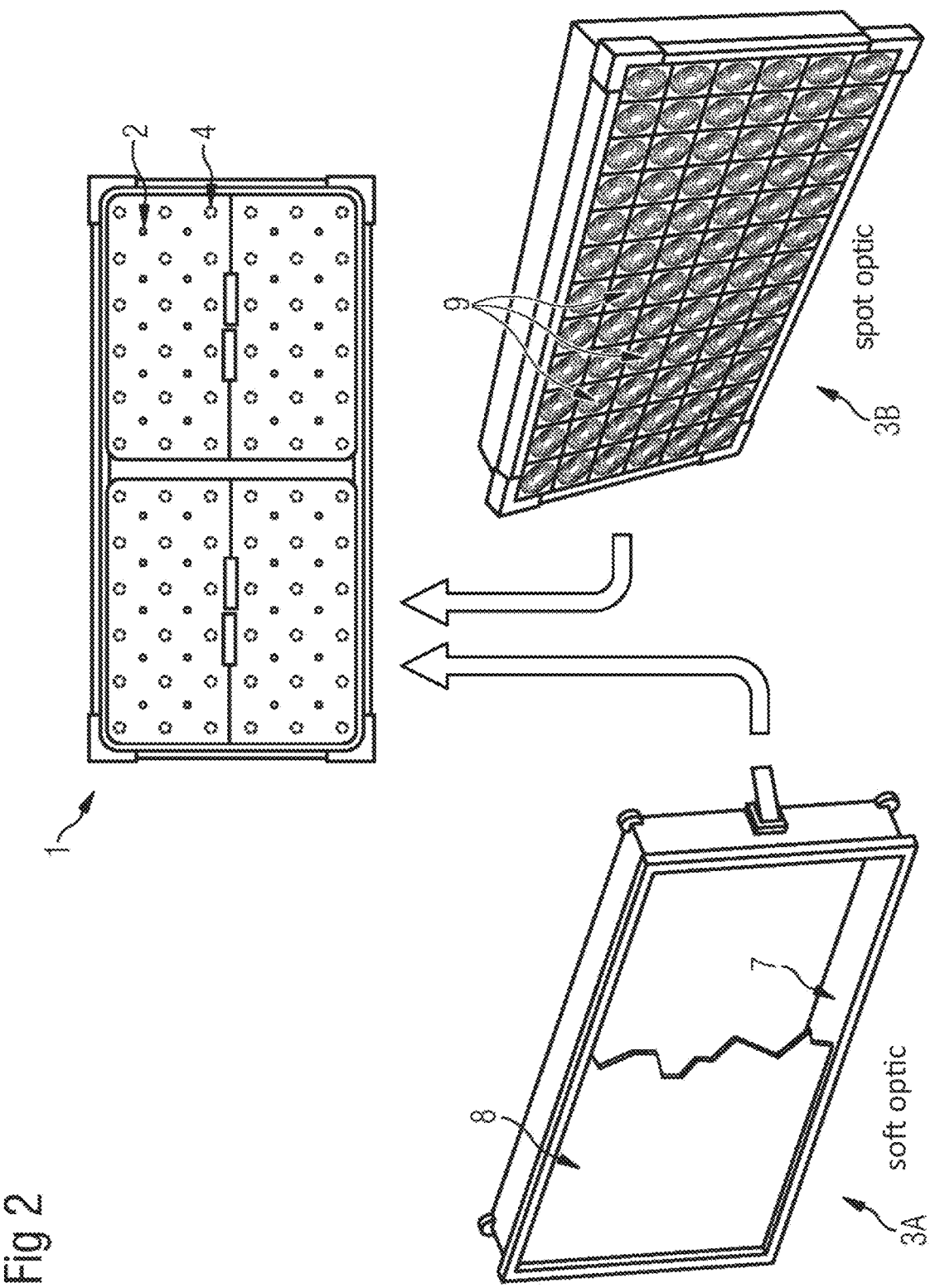
FIG. 2 illustrates a possible embodiment of an illumination apparatus.

FIG. 2 shows an embodiment of an illumination apparatus 1 with an LED light generating device 2 and replaceable light shaping devices 3A, 3B. In the embodiment shown in FIG. 2, the two replaceable light shaping devices 3A, 3B comprise on the one hand a replaceable soft optic device 3A and on the other hand a replaceable spot optic device 3B. The LED light generating device 2 comprises spatially distributed LED groups or LED clusters 4 for the generation of light on an emission surface. The light-emitting diodes are arranged in spatially distributed groups and can form a relatively large emission surface overall. For example, the LED light generating device 2 has 72 LED groups 4 on an emission surface of, for example, 60×30 cm. The LED groups 4 are preferably structured in such a way that light-emitting diodes of different colors are as close together as possible in a group 4.

To protect the LED light generating device 2 from environmental influences, a transparent, resistant protective screen is preferably located directly in front of the light-emitting diode groups 4 distributed on the emission surface. The protective screen provides protection against environmental influences, in particular moisture, dust and temperature fluctuations. The transparent protective screen is resistant and preferably offers protection class IP65 or higher. Preferably, screening webs are provided between the LED groups 4 arranged spatially distributed on the emission surface of the LED light generating device 2, which screen the light emitted laterally by the LEDs of the LED groups 4 completely or partially or change it in some other way. The LED light generating device 2 has a mechanical interface for attaching a replaceable light shaping device 3.

The light shaping device 3, in particular the two replaceable light shaping devices 3A, 3B shown in FIG. 2, preferably also have a protection class (ingress protection) of IP65 or higher. This makes it possible to use the light and its accessories outdoors without restrictions.

This replaceable light shaping device 3 can, for example, be a soft optic device 3A or a spot optic device 3B, as shown in FIG. 2. The replaceable soft optic device 3A reshapes the light emitted from the emission surface of the LED light generating device 2 for the generation of light with a large half-scatter angle of at least 90 degrees, so that a soft light effect can be achieved. The replaceable spot optic device 3B reshapes the light emitted from the emission surface of the LED light generating device 2 for the generation of light with a small half-scatter angle of less than 45 degrees, so that a hard light effect can be achieved. In addition to the soft optic device 3A and spot optic device 3B shown in FIG. 2, other replaceable light shaping devices 3 can also be mounted on the light generating device 2. These replaceable light shaping devices 3 are, for example, replaceable light domes (domes) or replaceable light troughs (softbox).

Figure 4A:
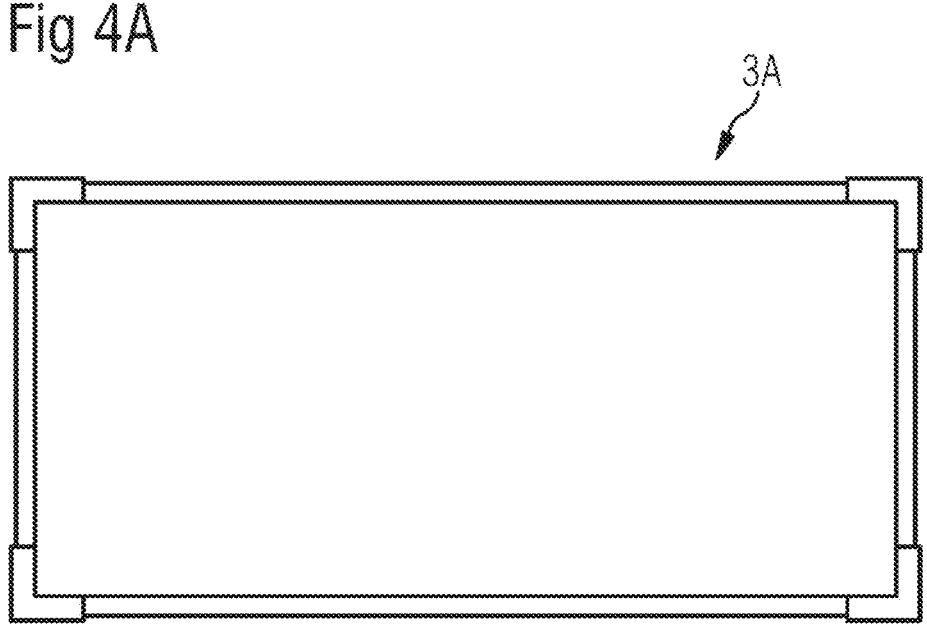
FIGS. 4A and 4B illustrate an example of a soft optic device with a corresponding light distribution curve.
Figure 4B:
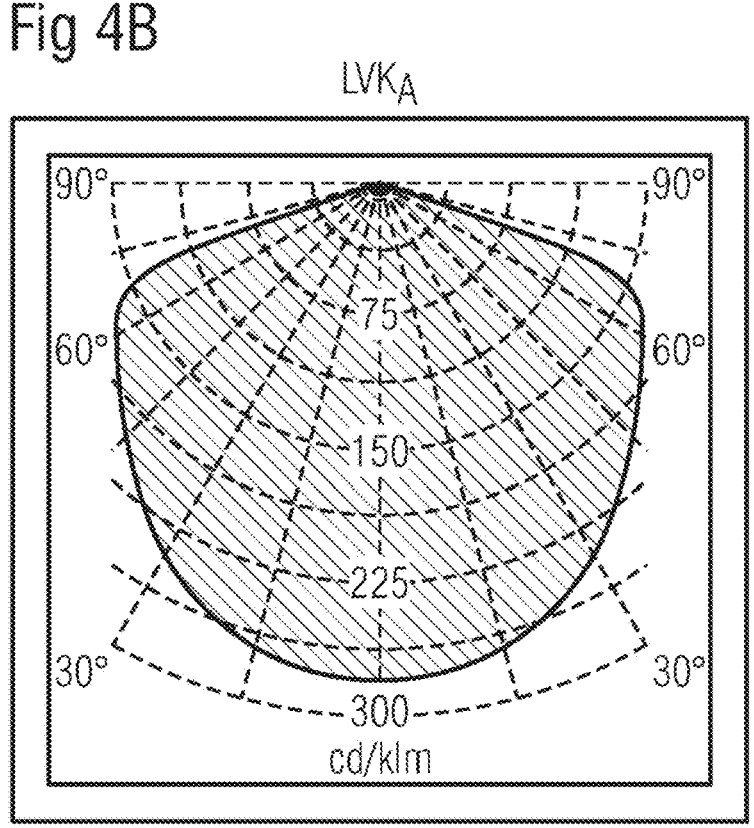

FIGS. 4A, 4B show an embodiment example of a soft optic device 3A with a corresponding light distribution curve LVK. The soft optic device 3A provides a homogeneous illuminated surface that produces soft light with a large half-scatter angle.

Figure 5A:
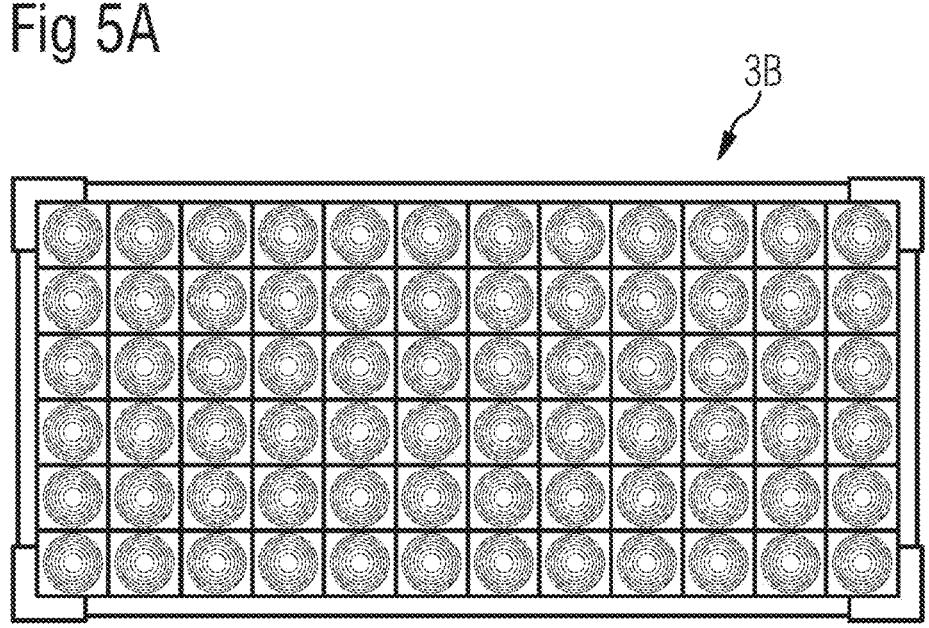
FIGS. 5A, 5B illustrate an example of a spot optic device with a corresponding light distribution curve.
Figure 5B:
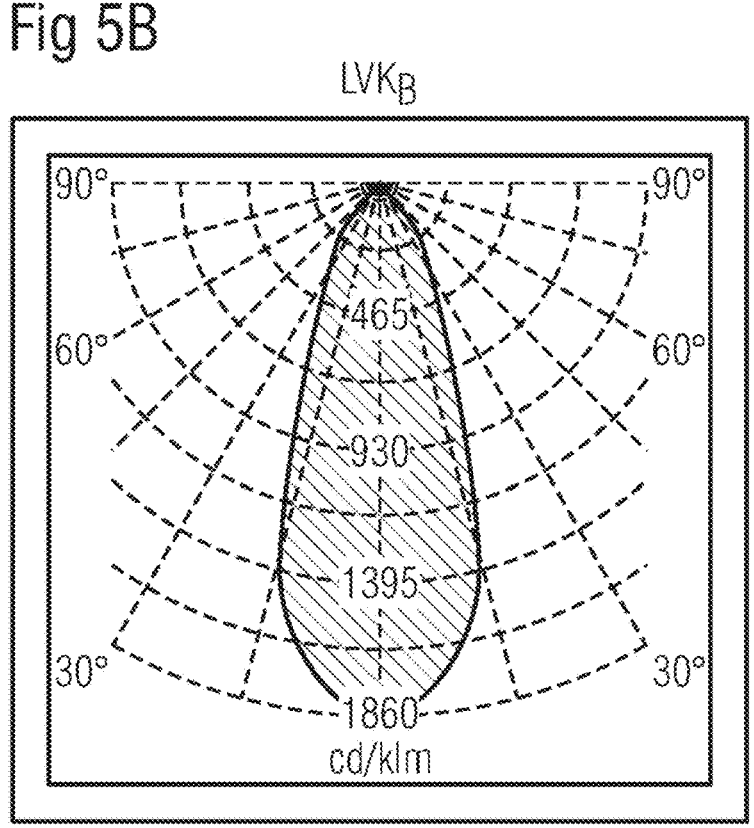

FIGS. 5A, 5B show an embodiment example of a spot optic device 3B with a corresponding light distribution curve LVK. The soft optic device 3B provides a narrowly focused emission of light with a relatively small half-scatter angle.

The illumination apparatus 1 makes it possible to change the radiation characteristic without reducing the energy efficiency or the light quality by exchanging the light shaping device 3 so that it corresponds to the light distribution curve LVK according to FIG. 4B or according to FIG. 5B. Furthermore, it is possible that different soft optic devices 3A with different light distribution curves are provided for the generation of light with different wide half-scatter angles. For example, a first soft optic device 3A generates light with a wide half-scatter angle of more than 80 degrees and another replaceable soft optic device 3A that generates light with a wide half-scatter angle of more than 100 degrees to achieve a soft light effect. For example, different soft optic devices 3B can also be provided, which generate light with a small half-scatter angle. For example, a first spot optic device 3B can generate light with a small half-scatter angle of less than 45 degrees and another spot optic device 3B can generate light with an even smaller half-scatter angle of less than 15 degrees, so that a hard light effect can be achieved.

In one possible embodiment, the various light shaping devices 3 are manually attachable in front of the protective screen of the LED light generating device 2 in a replaceable manner using mechanical connecting elements. For example, the replaceable light shaping devices 3A, 3B each have frame elements 5, which have mechanical connecting elements 6 that allow the respective light shaping device 3 to be attached to the LED light generating device 2.

In the embodiment example shown in FIG. 2, the soft optic device 3A comprises a hollow chamber with reflective side walls 7, to which a diffuser plate 8 for the generation of light with a soft light effect is permanently or replaceably mounted. Mechanical connecting elements 6 of the soft optic device 3A allow the soft optic device to be placed on the front of the LED light generating device 2 and mechanically attached using mechanical connecting elements 6, for example clip elements.

The spot optic device 3B shown in FIG. 2 can also be placed on the front side of the LED light generating device 2 using corresponding mechanical connecting elements 6 and mounted there mechanically. As shown in FIG. 2, the spot optic device 3B has a two-dimensional field of juxtaposed multi-lens optical systems 9, each arranged over corresponding LED groups 4 of the LED light generating device 2. The two-dimensional field of multi-lens optical systems 9 has a first number N=6 rows and M=12 columns. Further, the two-dimensional field of multi-lens optical systems 9 of the spot optic device 3B may include groups of three by three multi-lens optical systems 9 each, which may be independently controllable. In one possible implementation, the multi-lens optical systems 9 can be provided replaceably in the spot optic device 3B.

Alternatively, the spot optic device 3B comprises permanently mounted multi-lens optical systems 9, for example six times twelve multi-lens systems 9. In one possible embodiment, the various multi-lens optical systems 9 within the two-dimensional field of the spot optic device 3B can be addressed and controlled by a control device of the illumination apparatus 1 on the basis of their row number i and column number j. In one possible implementation, all multi-lens systems 9 of the spot optic device 3B can be adjusted or controlled independently of each other.

Each multi-lens optical system 9 within the two-dimensional field of the spot optic device 3B, as shown in FIG. 2, has a width B in an x-direction, a length L in a y-direction and a height H in a z-direction.

FIG. 3 shows a possible embodiment of a multi-lens optical system 9 within the spot optic device 3B shown in FIG. 2. The multi-lens optical system 9 of the spot optic device 3B has several optical components 9B, 9C, and 9D arranged one above the other. These optical components are, for example, optical lenses. These optical components are preferably delimited from neighboring multi-lens optical systems of the spot optic device 3B by a corresponding stray light limitation 9A of the respective multi-lens optical system 9.

The multi-lens optical system 9, as shown in FIG. 3, has a first optical component 9B, which is formed, for example, by a collimation lens 9B. The first optical component 9B collimates the light emitted by the corresponding LED cluster 4 of the light generating device 2 and directs it to a downstream second optical component 9C. The first optical component 9B captures as much of the light from the corresponding LED cluster 4 as possible and collimates or focuses this light.

The multi-lens optical system 9 also has a second optical component 9C arranged above the first optical component 9B, which is designed, for example, as a collimation lens 9B, which is designed, for example, as a condenser lens 9C. The second optical component 9C, in particular the condenser lens 9C, mixes the light emitted by the various light-emitting diodes of the LED group 4 and collected or focused by the first optical component 9B, in particular the collimation lens 9B. The second optical component 9C, for example, is a fly-eye honeycomb condenser that mixes the light from the various light-emitting diodes using facets.

The multi-lens optical system 9 of the spot optic device 3B may further comprise a third optical component 9D arranged above the second optical component 9C. In one possible embodiment, this third optical component 9D is formed by a Fresnel lens 9D. A Fresnel lens 9D can have a certain scattering structure on its rear side which, in conjunction with the condenser, ensures good color mixing and uniform spatial light distribution. The third optical component 9D emits the color-mixed light from the second optical component 9C with a predetermined light intensity distribution as light with a small half-scatter angle to achieve a hard light effect. For example, the third optical component 9D emits the color-mixed light into the far field with a defined light intensity distribution and with a narrow half-scatter angle of about 10 degrees, for example. The third optical component 9D can also be implemented by an optical component other than a Fresnel lens. For example, the third optical component 9D may be formed by a converging lens, a diverging lens, a diffuser disk, or a prism disk.

The various optical components 9B, 9C, and 9D of the multi-lens optical system 9 are preferably delimited by stray light limitations 9A, which prevent the light from the multi-lens optics 9 from shining into an adjacent multi-lens optics 9 of the spot optic device 3B and thus unintentionally widening the beam angle. In one possible implementation, the multi-lens optical system 9 of the spot optic device 3B comprises its own additional protective screen 9H for protection of the respective multi-lens optical system 9 against environmental influences on an entry side facing the corresponding LED cluster 4, i.e. at the bottom in FIG. 3, and/or on an exit side, i.e. at the top in FIG. 3.

The two protective screens 9H mounted at the top (not illustrated) and bottom and the converting stray light limitation 9A preferably form a closed housing of a multi-lens system module 9. This multi-lens system module 9 can be replaceably mounted on the spot optic device 3B in a possible implementation. For example, the spot optic device 3B with the six rows and twelve columns 72 has independently replaceable multi-lens optic modules 9. In one possible implementation, the multi-lens optical modules 9 have a width B in the x-direction, a length L in the y-direction and a height H in the z-direction. This makes it possible for the various optical multi-lens systems 9 to have different heights H in order to achieve certain lighting effects. The provision of replaceable multi-lens modules 9 allows a user to customize a spot optic device 3B for the particular application.

In a possible embodiment of the illumination apparatus 1, a distance between the third optical component 9D and the second optical component 9C of a multi-lens optical system 9 of the spot optic device 3B can be automatically or manually adjusted to change the respective half-scatter angle of the respective multi-lens optical system 9. In a preferred embodiment, the distance between the third optical component 9D and the second optical component 9C of a multi-lens optical system 9 is adjusted by means of a corresponding controllable actuator 9E. This actuator 9E is, for example, a servomotor, a piezo drive, or a hydraulic drive element. In one possible embodiment, the actuator 9E is integrated into the optical multi-lens system module 9 and is controlled via a local interface of the multi-lens system module 9.

The controllable actuator 9E is preferably addressable within the two-dimensional field of the spot optic device 3B by a control device (not illustrated), for example by means of an address comprising the row number and column number within the two-dimensional field. Furthermore, setting values for adjusting the distance between the third optical component 9D and the second optical component 9C of the multi-lens optical system 9 can be set by the control device (not illustrated) for controlling the respective actuator 9E.

The actuators of the various multi-lens optical systems 9 of the spot optic device 3B are preferably controlled independently of one another by a control device 9F for adjusting the half-scatter angle of the light emitted by the respective multi-lens optical system 9 of the spot optic device 3B. This control device 9F can be integrated into the spot optic device 3B. Furthermore, a beam angle of a light beam emitted by the multi-lens optical system 9 of the spot optic device 3B can be adjusted by another control device 9G. This control device 9G can also be integrated into the housing of the spot optic device 3B. With the help of the actuator 9E, it is possible to provide a zoom optic with a variable beam angle for each multi-lens optical system 9 within the spot optic device 3B. The spot optic device 3B is constructed in such a way that it contains largely identical components over a wide range of beam angles, for example 10 to 30 degrees. For example, the collimation lens 9B, the second optical component 9C and the third optical component 9D can be used with a 10 degree optic and also with a 20 degree optic. A larger beam angle results from a smaller distance between the third optical component 9D, for example a Fresnel lens 9D, and the other components.

To create certain lighting effects or lighting effects, it is possible to provide individual LED clusters or LED groups 4 of the light generating device 2 with different spot optics and/or with spot optics for which different half-scatter angles can be set. With electronically adjustable brightness and color of the LED groups 4 of the light generating device 2, this results in a wide range of possibilities for the generation of special light and color effects using a type of matrix light in which individual areas of the light field can be faded in or out. Furthermore, in one possible embodiment, it is possible to use optical components that allow the emission direction to be changed in a certain angular range, such as adjustable prism plates, piezo-moving micro-optics or similar. This makes it possible to use the illumination apparatus 1 to illuminate various objects, including moving objects. In one possible embodiment, the emission direction of a light emitted by a multi-lens optical system 9 of the spot optic device 3B can be adjusted by a control device. This control device can be integrated into the spot optic device 3B.

In one possible embodiment of the illumination apparatus 1, the various control devices can communicate with each other via a control and data bus. For this purpose, in addition to the mechanical interface, a control and data interface is provided between the LED light generating device 2 and the light shaping device 3.

For example, the LED light generating device 2 comprises a control unit with a microprocessor or controller as a basic element, which controls various controllable elements within the light shaping device 3 via the data and control interface. For example, the control unit can use the control and data interface to control the actuators of the multi-lens systems 9 of the spot optic device 3B attached to the light generating device 2. In one possible implementation, the various controllable multi-lens optical systems 9 are addressable by means of their column and row number within the two-dimensional field of the spot optic device 3B and can receive corresponding control signals or setting values from the control unit of the illumination apparatus 1.

Furthermore, in one possible implementation, the control unit of the lighting device 1 can control the various LED groups 4 of the LED light generating device 2. For example, a specific LED group 4 or a specific LED cluster is switched on so that it emits light strongly through a corresponding single optic or multi-lens optical system 9 arranged above it. The control of the illumination apparatus 1 can simultaneously control an actuator 9E of the corresponding optical multi-lens systems 9, for example to adjust the beam angle. This can be done independently of each other for a variety of different multi-lens optical systems 9 and corresponding LED clusters 4 arranged below them. This allows a very large number of different lighting effects to be achieved.

In another possible embodiment, the soft optic device 3A may also have a control unit that can be connected to the control and data bus of the light generating device 2 via a control and data interface. For example, in one possible implementation, the control unit of the soft optics 3A can adjust the transparency of the diffuser plate 8 depending on a control signal. Further embodiments of the illumination apparatus 1 are possible. In one possible embodiment, a plurality of replaceable light shaping devices 3 can be mounted stacked on top of each other in front of the transparent and resistant protective screen of the LED light generating device 2 for shaping the light emitted by the illumination device 1.

In a further possible embodiment of the illumination apparatus 1, the control of the illumination apparatus 1 for controlling the controllable components of the light generating device 2 and for controlling the controllable components of the light shaping device 3 is connected via a device interface to a bus of a central control of an illumination arrangement. For example, the controller integrated into the illumination apparatus 1 comprises a DMX interface for connection to a central console of a lighting system. This allows the control unit of the illumination apparatus 1 to communicate with a central control unit of the lighting system in accordance with a corresponding communication protocol. For example, the various multi-lens optical systems 9 can be set as independently controllable elements of the spot optic device 3B via different DMX channels.

Further embodiments of the illumination apparatus 1 are possible. In one possible implementation, the control of the illumination apparatus 1 recognizes the type of light shaping device 3 mounted in front of the protective screen. For example, a control unit integrated locally into the light shaping device 3 can communicate with the controller of the illumination apparatus 1 integrated into the LED light generating device 2 and transmit certain parameters. For example, the control of the illumination apparatus 1 can recognize whether the mounted replaceable light shaping device 3 is a soft optic device 3A or a spot optic device 3B.

In a further possible embodiment of the illumination apparatus, the LED light generating device 2 has a user interface for entering certain parameters or values. For example, a user can use the user interface to tell the controller of the illumination apparatus 1 whether the light shaping device 3 mounted manually on the front is a soft optic device 3A or a spot optic device 3B. Furthermore, a type of soft optic device 3A and a type of spot optic device 3B can be entered via the user interface. For example, a user enters via the user interface of the LED light generating device 2 that the mounted light shaping device 3 is a spot optic device 3B comprising six by twelve multi-lens systems 9. In this case, the control of the LED light generating device 2 can, for example, activate all 72 corresponding LED clusters 4 for the generation of light. However, if the mounted spot optic device 3B has a small number of multi-lens optical systems 9, the control of the light generating device 2 can, for example, activate a correspondingly smaller number of LED clusters 4. This further increases energy efficiency.

Further embodiments of the illumination apparatus 1 are possible. For example, the replaceable light shaping device 3 can be folded in front of the protective screen of the LED light generating device 2 using a folding mechanism and fixed there. For example, in one possible implementation, there is a hinged soft optic device 3A on one side of the LED light generating device 2 and a hinged spot optic device 3B on another opposite side of the LED light generating device 2. Alternatively, it is possible to mechanically detach the soft optic device 3A and/or the spot optic device 3B from the LED light generating device 2 and replace it with another light shaping device 3.

There are further possible embodiments of the illumination apparatus 1. For example, in one possible implementation, the illumination apparatus 1 may have a graphical user interface GUI that displays, for example, the instantaneous light distribution curve LVK provided by the currently mounted replaceable light shaping device 3. The light distribution curve LVK of a light shaping device 3 can be stored in a local memory of the light shaping device 3 and is transmitted to the graphical user interface GUI of the illumination apparatus 1 via a data interface and a local data bus of the LED light generating device 2 after the light shaping device 3 has been mounted and installed, where it is displayed to a user.

The illumination apparatus 1 is characterized by a high degree of flexibility for achieving a wide variety of lighting effects, while at the same time the energy efficiency remains undiminished. In addition, the illumination apparatus 1 according to the invention is highly resistant to environmental influences.

What is claimed is:

1. An illumination apparatus, comprising:
   an LED light generating device comprising groups of differently colored LEDs spatially distributed on an emission surface of a substrate for the generation of light, the generated light being emitted from the emission surface of the LED light generating device through a transparent and resistant protective screen of the LED light generating device; and
   a replaceable light shaping device mounted in front of the transparent and resistant protective screen of the LED light generating device for shaping the light emitted from the emission surface of the LED light generating device, the replaceable light shaping device comprising a replaceable spot optic device configured to shape the light emitted from the emission surface of the LED light generating device for the generation of light with a small half-scatter angle of less than 45 degrees, the spot optic device including a two-dimensional field of juxtaposed replaceable or fixedly mounted multi-lens optical systems, each of which is arranged above a corresponding group of LEDs of the LED light generating device, the multi-lens optical systems of the spot optic device each including a first optical component which collimates the light emitted by the corresponding group of LEDs of the LED light generating device, a second optical component arranged above the first optical component and configured to mix the light emitted by the differently colored LEDs of the group of LEDs and collected by the first optical component, and a third optical component arranged above the second optical component and configured to emit the color-mixed light from the second optical component with a predetermined light intensity distribution as light with a small half-scatter angle; and
   a plurality of controllable actuators, each of the plurality of controllable actuators configured to adjust a distance between the third optical component and the second optical component of a corresponding one of the multi-lens optical systems.

2. The illumination apparatus of claim 1, wherein the transparent and resistant protective screen for protection of the LED light generating device against environmental influences is provided directly in front of the emission surface of the LED light generating device.

3. The illumination apparatus of claim 2, wherein a housing of the LED light generating device provided with the transparent and resistant protective screen offers protection of protection class IP65 or higher.

4. The illumination apparatus of claim 1, wherein the groups of LEDs arranged spatially distributed on the emission surface of the LED light generating device each comprise a plurality of differently colored LEDs, positioned close to one another on the emission surface of the LED light generating device.

5. The illumination apparatus of claim 4, wherein between the LED groups arranged on the emission surface of the LED light generating device in a spatially distributed manner, screening webs are provided which at least partially screen the light emitted laterally by the LEDs of the LED groups.

6. The illumination apparatus of claim 5, wherein each multi-lens optical system of the spot optic device comprises a plurality of optical components arranged one above the other, which are delimited from neighboring multi-lens optical systems of the spot optic device by a corresponding stray light limitation of the respective multi-lens optical system.

7. The illumination apparatus of claim 1, wherein the two-dimensional field of multi-lens optical systems comprises a first number, N, of rows and a second number, M, of columns.

8. The illumination apparatus of claim 7, wherein each multi-lens optical system within the two-dimensional field of the spot optic device has a width, B, in an x-direction, a length, L, in a y-direction and a height, H, in a z-direction, wherein a surface oriented in the x-direction and in the y-direction is aligned parallel to the emission surface of the LED light generating device.

9. The illumination apparatus of claim 8, wherein the multi-lens optical systems have the same or different heights, H, within the two-dimensional field of the spot optic device.

10. The illumination apparatus of claim 7, wherein the various optical multi-lens systems within the two-dimensional field of the spot optic device can be addressed by a control device by means of a row number, i, and by means of a column number, j.

11. The illumination apparatus of claim 1, wherein the first optical component is a collimation lens.

12. The illumination apparatus of claim 1, wherein the second optical component is a condenser lens.

13. The illumination apparatus of claim 1, wherein the third optical component is a Fresnel lens.

14. The illumination apparatus of claim 1, wherein a distance between the third optical component and the second optical component of a multi-lens optical system of the spot optic device is automatically or manually adjustable to change the half-scatter angle of the respective multi-lens optical system.

15. The illumination apparatus of claim 1, wherein the controllable actuator is one of a servomotor, a piezo drive, and a hydraulic drive.

16. The illumination apparatus of claim 1, wherein the actuator of the optical multi-lens system can be addressed by a control device by means of a row number, i, and by means of a column number, j, of the optical multi-lens system within the two-dimensional field of the spot optic device and receives setting values for setting the distance between the third optical component and the second optical component of the optical multi-lens system from the control device.

17. The illumination apparatus of claim 1, wherein a ratio between a half-scatter angle of the hard light emitted from the multi-lens optical system of the spot device to a half-scatter angle of the soft light emitted from the soft optic is about one to four.

18. The illumination apparatus of claim 1, wherein the half-scatter angle of the hard light emitted by the multi-lens optical system of the spot optic device is adjustable in a range between 10 degrees and 30 degrees.

19. The illumination apparatus of claim 1, further comprising a first control device configured to independently control each of the groups of LEDs of the LED light generating device to adjust at least one of the brightness and the color of the light generated by the respective LED group.

20. The illumination apparatus of claim 19, wherein the first control device is integrated into the LED light generating device.

21. The illumination apparatus of claim 1, wherein the controllable actuators of the multi-lens optical systems of the spot optic device are configured to be controlled independently of one another by a second control device for adjusting the half-scatter angle of the light emitted by the respective multi-lens optical system of the spot optic device.

22. The illumination apparatus of claim 21, wherein the second control device is integrated into the spot optic device.

23. The illumination apparatus of claim 1, wherein an emission direction of a light emitted from a multi-lens optical system of the spot optic device is adjustable by a third control device.

24. The illumination apparatus of claim 23, wherein the third control device is integrated into the spot optic device.

25. The illumination apparatus of claim 1, wherein each of the multi-lens optical systems of the spot optic device comprises a protective screen for protection of the each of the multi-lens optical systems on at least one of an entry side facing the corresponding LED groups and an exit side.

26. The illumination apparatus of claim 1, wherein a plurality of replaceable light shaping devices are mounted stacked on top of each other in front of the transparent and resistant protective screen of the LED light generating device for shaping the light emitted from the illumination apparatus, wherein each replaceable light shaping device offers a protection class IP65 or higher.

27. The illumination apparatus of claim 1, wherein the two-dimensional field of multi-lens optical systems of the spot optic device has six rows and twelve columns.

28. The illumination apparatus of claim 27, wherein the two-dimensional field of multi-lens optical systems of the spot optic device comprises groups of three by three multi-lens optical systems in each case.

* * * * *